S. Wheeler,
Universal Joint.
N° 79,168. Patented June 23, 1868.
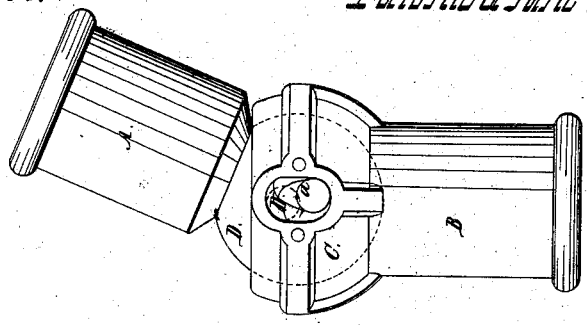
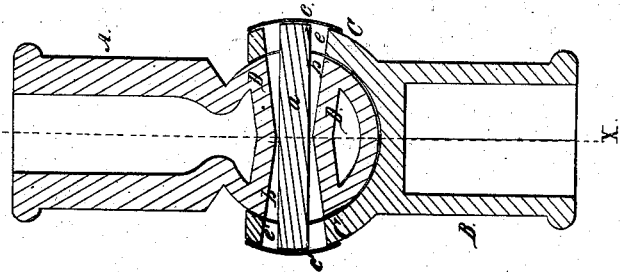
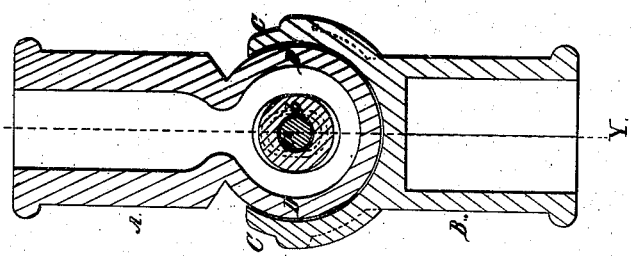
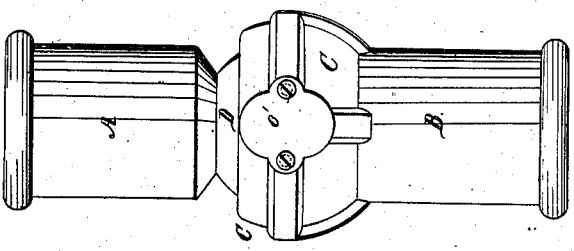
Witnesses:
R. T. Campbell
J. H. Campbell
Inventor:
Seth Wheeler
by Munn-Fennie Lawman

United States Patent Office.

SETH WHEELER, OF ALBANY, NEW YORK.

*Letters Patent No. 79,168, dated June 23, 1868.*

IMPROVEMENT IN SHAFT-COUPLINGS.

*The Schedule referred to in these Letters Patent and making part of the same.*

TO ALL WHOM IT MAY CONCERN:

Be it known that I, SETH WHEELER, of Albany, in the county of Albany, and State of New York, have invented a new and improved Articulating Shaft-Coupling; and I do hereby declare that the following is a full, clear, and exact description thereof, reference being had to the accompanying drawings, making a part of this specification, in which—

Figure 1 is a view of one side of the improved coupling.

Figures 2 and 3 are sections, taken diametrically through the coupling, in planes at right angles to each other.

Figure 4 is a side view of the coupling, exposing its driving-pin.

Similar letters of reference indicate corresponding parts in the several figures.

This invention relates to certain novel improvements on shaft-couplings which are designed for connecting driving and driven shafts that are required to rotate when arranged at obtuse angles to each other.

The nature of my invention consists in coupling shafts which deviate from a right line, and which are required to rotate, by means of a spherical enlargement, or an enlargement approaching the form of a sphere, fitted into a suitable socket, and connected to the portion having the socket formed in it by a rolling driving-pin or pins, which will allow the shafts coupled by such joint free articulation with as little friction as possible, as will be hereinafter explained.

To enable others skilled in the art to understand my invention, I will describe its construction and operation.

The coupling which I have represented in the accompanying drawings consists of a spherical enlargement or ball, D, partially enclosed within a shell or socket, C, and connected to this socket, so as to turn with it, or be turned by it, by means of a driving-pin, $a$, which passes diametrically through the ball and socket, and is enclosed therein by means of caps $c\ c'$, as shown in the drawings.

The spherical enlargement D is cast with a tubular sleeve, A, upon it, for receiving the square end of a driving or driven shaft; and the shell or socket which receives this spherical enlargement is also cast with a tubular sleeve, B, for a like purpose. These tubular sleeves allow the coupling to be readily applied to or removed from shafting, at pleasure, and, when necessary, a slight endwise adjustment of the parts will be allowed by said sleeves.

The ball or spherical enlargement is cast either solid or hollow, and it has a hole, $b$, diametrically through it, which is made circular in its centre or axis, and flares outwardly on each side of this central hole, as shown in fig. 3. The flaring portions of the hole $b$ are made elliptical or oblong in a direction with the axis of the sleeve A, so as to allow a free articulation of the joint independently of the pin $a$.

After casting the ball or spherical enlargement D, it is suitably adjusted in a mould, and the shell or socket-portion C cast about it, thus permanently connecting the two parts C D together, but allowing the latter to move freely in its socket.

On one side, inside of the socket or shell C, is an oblong recess, $e$; and diametrically opposite this recess an oblong hole, $e'$, is made through the shell C, which is covered by means of a removable cap, $c'$, and which admits of the insertion of pin $a$ into its place, as shown in figs. 2 and 4.

The oblong hole $e'$ and recess $e$ receive the extremities of the driving-pin $a$, and allow a free universal motion to the joint.

In the construction of the hole $b$ through the ball D, and the recess and hole in and through the shell, care should be observed that they are diametrically opposite each other, and somewhat larger than the pin $a$, which they are to receive, so that this pin will have sufficient play to allow it to roll against its impinging surfaces in the socket or shell during the articulation of the joint, thereby preventing undue friction and binding of the parts.

I do not confine my invention to the particular style or form of coupling herein described, although I prefer to adopt the ball-and-socket form, with a pin, $a$, or its equivalent, passing through a hole made through the ball, and entering slots or recesses made in the shell, substantially as set forth.

Instead of having a pin or stud, $a$, to pass through the ball or enlargement D, studs may be cast upon the enlargement adapted for receiving anti-friction rollers upon them, which will roll against the sides of slots or recesses made in the shell; or, if desirable, the rollers may be applied upon the inner face of the shell and grooves, or recesses made in the periphery of the ball, for receiving such rollers.

Neither do I confine my invention to the casting of the shell or socket permanently about the ball, as this socket might be cast in separate sections, suitably secured together, so as to enclose the ball or other suitably-shaped enlargement.

I am aware that it is not new, in the construction of universal couplings, to cast a shell upon a ball or enlargement, so as to allow the parts to articulate, said enlargement and shell both having feathers cast upon them, for communicating rotary motion from the driving to the driven shaft. Such a coupling is necessarily attended with a very large amount of friction, caused by the constant rubbing and sliding of the feathers upon each other during the articulation of the joint.

By my invention, I provide for a free articulation of the coupling, and connect the two parts together, so that one will drive or rotate the other by means of a pin or stud, which will roll freely, and prevent undue friction and wear.

Having described my invention, what I claim as new, and desire to secure by Letters Patent, is—

1. A ball-and-socket or other analogous closed coupling, having an anti-friction pin, stud, or roller applied to it, substantially as and for the purpose described.

2. Constructing the socket C with recesses in or through it, adapted for receiving a pin, $a$, which is applied to an enlargement, D, of a spherical or other shape, substantially as described.

3. Fitting the driving-pin $a$ into a flaring hole, $b$, made through an enlargement, which works in a socket, C, and covered by means of caps $c$ $c$, or their equivalents, substantially as and for the purpose described.

4. An articulating coupling, with a pin, stud, or roller, which is free to roll on its impinging surfaces, and also to vibrate, substantially as described.

5. The combination of the flaring or oblong pin-hole or slot in the ball of the coupling with the oblong slots of the socket, substantially as described.

SETH WHEELER.

Witnesses:
M. V. B. WINNE,
E. WACKERHAGEN.